(12) United States Patent
Humer et al.

(10) Patent No.: US 7,104,602 B2
(45) Date of Patent: Sep. 12, 2006

(54) VEHICLE SEAT HAVING A MOVEABLE HEAD RESTRAINT

(75) Inventors: Mladen Humer, East Pointe, MI (US); Gerry Locke, Lake Orion, MI (US); Karl Schafer, Holly, MI (US); Nagarjun Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 280 days.

(21) Appl. No.: 10/880,891

(22) Filed: Jun. 30, 2004

(65) Prior Publication Data

US 2006/0001308 A1 Jan. 5, 2006

(51) Int. Cl.
*B60N 2/427* (2006.01)
(52) U.S. Cl. ................................. 297/216.12
(58) Field of Classification Search ........... 297/216.12, 297/408, 410
See application file for complete search history.

(56) References Cited

U.S. PATENT DOCUMENTS

| | | | |
|---|---|---|---|
| 4,350,389 A * | 9/1982 | Parsson et al. ............. | 297/410 |
| 5,695,251 A | 12/1997 | Scolari | |
| 5,748,473 A | 5/1998 | Breed et al. | |
| 5,975,637 A | 11/1999 | Geuss et al. | |
| 6,135,561 A * | 10/2000 | Kruger et al. ............... | 297/408 |
| 6,199,947 B1 * | 3/2001 | Wiklund ................. | 297/216.12 |
| 6,213,549 B1 | 4/2001 | Wieclawski | |
| 6,270,161 B1 | 8/2001 | De Filippo | |
| 6,273,511 B1 | 8/2001 | Wieclawski | |
| 6,416,125 B1 | 7/2002 | Shah et al. | |
| 6,478,373 B1 | 11/2002 | Hake et al. | |
| 6,485,096 B1 | 11/2002 | Azar et al. | |
| 6,604,788 B1 | 8/2003 | Humer | |
| 6,631,949 B1 | 10/2003 | Humer et al. | |
| 6,631,955 B1 | 10/2003 | Humer et al. | |
| 6,655,733 B1 | 12/2003 | Fan et al. | |
| 6,746,078 B1 * | 6/2004 | Breed ..................... | 297/216.12 |
| 6,779,840 B1 * | 8/2004 | Farquhar et al. ........ | 297/216.12 |

* cited by examiner

*Primary Examiner*—Peter R. Brown
(74) *Attorney, Agent, or Firm*—Brooks Kushman P.C.

(57) ABSTRACT

A vehicle seat for use with a vehicle. The vehicle seat includes a seatback having a frame, a head restraint arrangement, an impact target arrangement, and a ratchet screw mechanism. The impact target arrangement is attached to the head restraint arrangement and moveably attached to the frame. The ratchet screw mechanism includes a first threaded member and a second threaded member. Upon application of a rearward force on the impact target arrangement, the first threaded member at least partially disengages the second threaded member to allow the head restraint arrangement to move from an initial position to a support position.

20 Claims, 3 Drawing Sheets

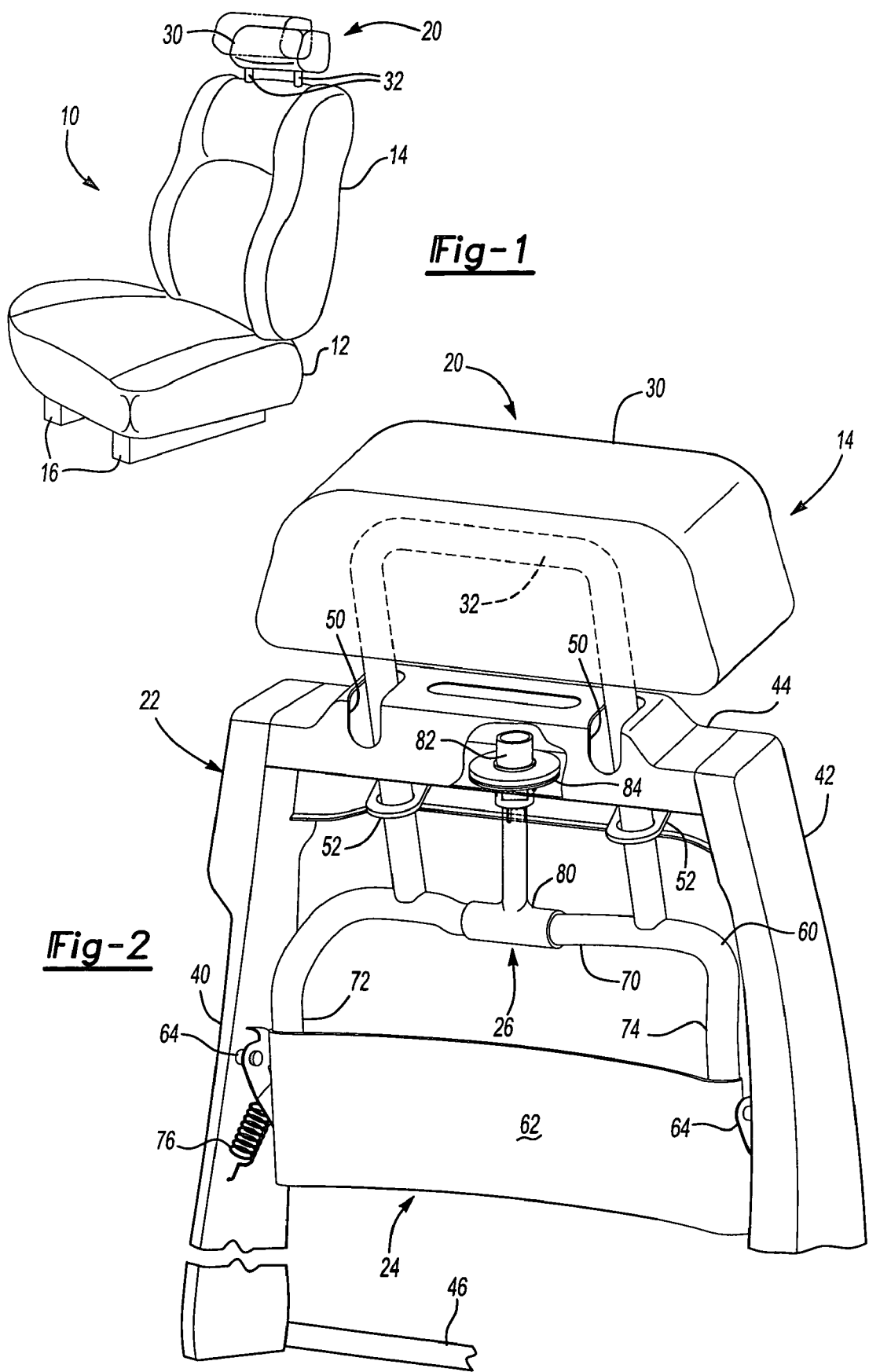

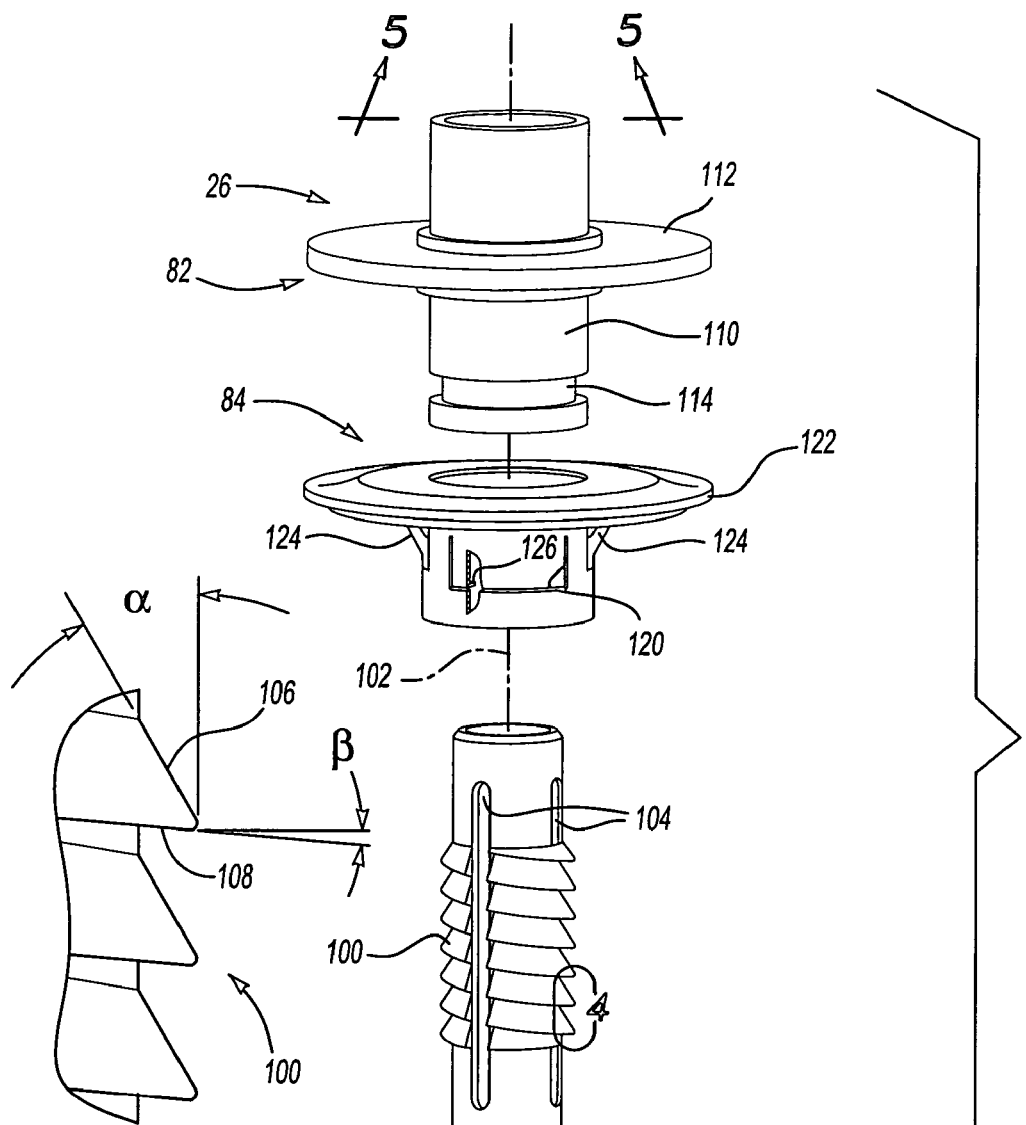
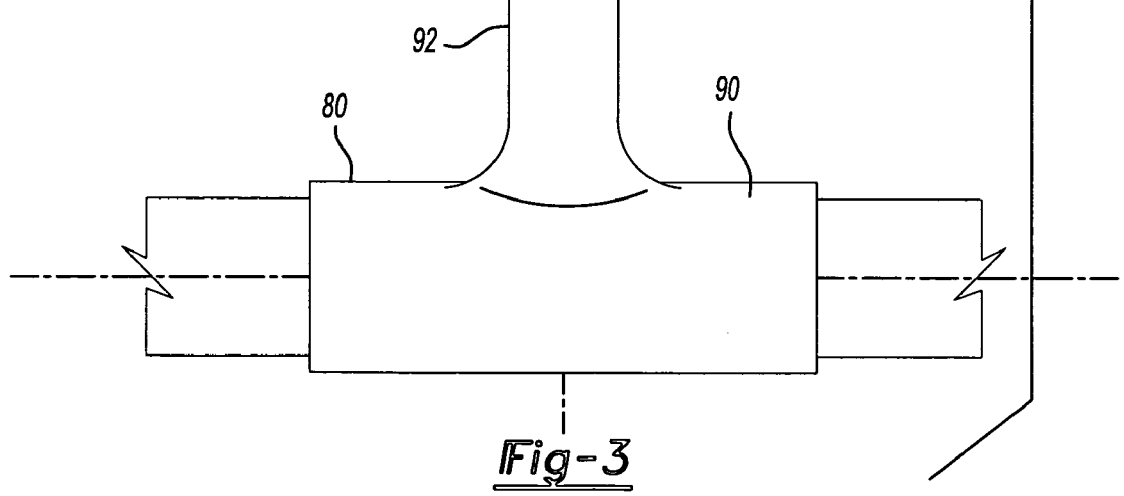
Fig-4
Fig-3

VEHICLE SEAT HAVING A MOVEABLE HEAD RESTRAINT

BACKGROUND OF THE INVENTION

1. Field of the Invention

The present invention relates to a vehicle seat having a moveable head restraint.

2. Background Art

Vehicle seats having moveable head restraints or headrest arrangements are known in the vehicle seating art, such as the headrest arrangement disclosed in U.S. Pat. No. 6,604,788.

SUMMARY OF THE INVENTION

According to one aspect of the present invention, a vehicle seat for use with a vehicle is provided. The vehicle seat includes a seatback having a frame, a head restraint arrangement, an impact target arrangement, and a ratchet screw mechanism. The impact target arrangement is attached to the head restraint arrangement and is moveably attached to the frame. The ratchet screw mechanism includes a first threaded member and a second threaded member. The first threaded member is disposed proximate the impact target arrangement. The second threaded member is engageable with the first threaded member and associated with the frame. Upon application of a sufficient rearward force on the impact target arrangement, the first threaded member is configured to at least partially disengage from the second threaded member to allow the head restraint arrangement to move from an initial position to a support position.

The first threaded member may include a first tubular portion and a second tubular portion. The first tubular portion may be moveably disposed on the impact target arrangement. The second tubular portion may be disposed proximate the first tubular portion. The second tubular portion may include a first threaded section configured to flex in response to application of the rearward force on the impact target arrangement to allow the first threaded member to ratchet through the second threaded member.

The second threaded member may include a body portion and a thrust bearing portion. The thrust bearing portion may be disposed proximate the body portion and may be configured to inhibit rotation of the second threaded member.

A retaining member may be attached to the frame and configured to receive the second threaded member. The retaining member may include a retention tab and a spring portion that cooperate to attach the retaining member to the frame.

The frame may include a locking arm disposed proximate the spring portion. The locking arm may be adapted to inhibit rotation of the second threaded member about the first threaded member when the head restraint arrangement is actuated toward the initial position. The spring portion may be configured to bias the second threaded member away from the locking arm to permit the second threaded member to rotate about the first threaded member.

According to another aspect of the present invention, a vehicle seat for use with a vehicle is provided. The vehicle seat includes a seatback, a locking arm, a head restraint arrangement, an impact target arrangement, and a ratchet screw mechanism. The seatback includes a frame. The locking arm is disposed on the frame. The head restraint arrangement includes a headrest and a support member connected to the headrest. The impact target arrangement is attached to the head restraint arrangement and moveably attached to the frame. The ratchet screw mechanism includes a first threaded member, a second threaded member, and a retaining member. The first threaded member is disposed on the impact target arrangement and has an external threaded portion. The second threaded member has an internal threaded portion engageable with the external threaded portion. The retaining member is attached to the frame and configured to receive the second threaded member. Upon application of a sufficient rearward force on the impact target arrangement, the first threaded member is configured to at least partially disengage from the second threaded member to allow the head restraint arrangement to move from an initial position to a support position, and the locking arm is configured to inhibit rotation of the second threaded member to inhibit movement of the head restraint arrangement from the support position to the initial position when a sufficient impulse force is applied to the headrest by a vehicle occupant.

The second threaded member may include a thrust bearing portion adapted to contact the locking arm when a sufficient impulse force is applied to the headrest.

A first coefficient of friction between the thrust bearing portion and the locking arm may be greater than a second coefficient of friction between the internal and external threaded portions.

The retaining member may include a spring portion configured to bias the second threaded member away from the locking arm. The retaining member may include a retention tab engageable with the frame.

The external threaded section may be configured to flex to allow the first threaded member to ratchet through the second threaded member to move the head restraint arrangement toward the support position when the rearward force is applied to the impact target arrangement.

According to another aspect of the present invention, a vehicle seat for use with a vehicle is provided. The vehicle seat includes a seatback having a frame, a locking arm disposed on the frame, a head restraint arrangement having a headrest and a support member connected to the headrest, an impact target arrangement, and a ratchet screw mechanism. The impact target arrangement is attached to the head restraint arrangement and moveably attached to the frame. The ratchet screw mechanism includes a first threaded member, a second threaded member, and a retaining member. The first threaded member is disposed on the impact target arrangement and includes an external threaded portion. The second threaded member includes an internal threaded portion engageable with the external threaded portion. The retaining member is attached to the frame and adapted to receive the second threaded member. Upon application of a threshold level of force on the impact target arrangement, the external threaded portion is configured to flex to at least partially disengage the internal threaded portion to allow the head restraint arrangement to move from an initial position to a support position.

The locking arm may be configured to inhibit rotation of the second threaded member to inhibit movement of the head restraint arrangement from the support position to the initial position when a sufficient impulse force is applied to the headrest by a vehicle occupant.

The retaining member may include a spring portion configured to bias the second threaded member away from the locking arm. The second threaded member may include a thrust bearing portion adapted to contact the locking arm when sufficient force is applied to the headrest to overcome a biasing force exerted by the spring portion.

The external threaded portion may include a plurality of threaded regions separated by a plurality of axial slots.

BRIEF DESCRIPTION OF THE DRAWINGS

FIG. 1 is a perspective view of a vehicle seat having a seatback.

FIG. 2 is a cutaway perspective view of the seatback having a ratchet screw mechanism.

FIG. 3 is an exploded perspective view of the ratchet screw mechanism.

FIG. 4 is a section view of an external threaded portion of the ratchet screw mechanism.

DETAILED DESCRIPTION OF THE PREFERRED EMBODIMENT(S)

Figure 5:
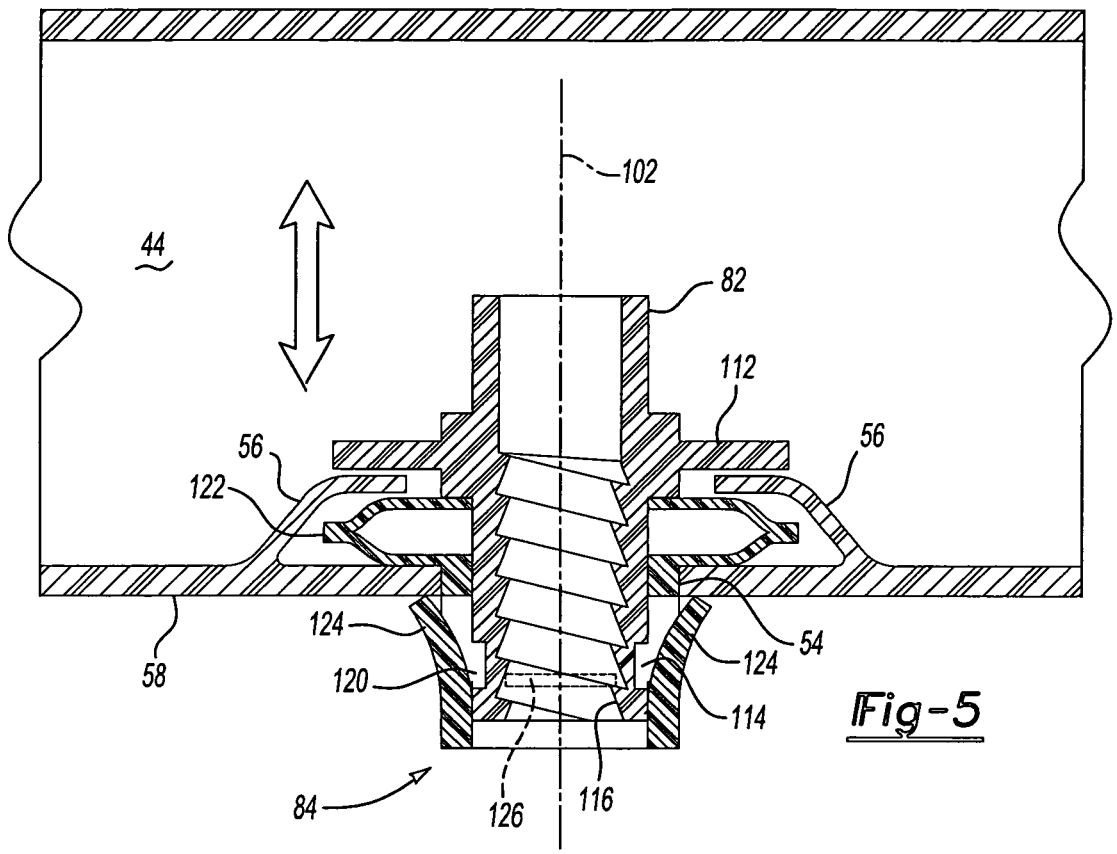
FIG. 5 is a cross-section of the ratchet screw mechanism in an unlocked position.

Certain terminology presented below is used for convenience in reference only and is not intended to be limiting. More specifically, directional language such as "left", "right", "above", "below", "upper", "lower" and words of similar import designate directions shown in the drawings. Such directional terminology is used for clarity and is not intended to strictly limit the orientation of any aspect of the invention to a particular plane or direction.

Referring to FIG. 1, a vehicle seat assembly 10 is shown. The vehicle seat assembly 10 includes a seat bottom 12 and a seat back 14. The seat bottom 12 may be attached to a vehicle floor and/or to seat adjuster mechanisms 16 that enable lateral and/or vertical movement of the seat bottom 12 with respect to the vehicle floor. The seat back 14 may be pivotally connected to the seat bottom 12.

Referring to FIG. 2, the seat back 14 is shown in more detail. The seat back 14 includes a moveable head restraint arrangement 20, a frame 22, an impact target arrangement 24, and a ratchet screw mechanism 26.

The head restraint arrangement 20 is moveably associated with the seat back 14. More specifically, the head restraint arrangement 20 is moveable between an initial position shown in solid lines in FIG. 1 and a support position shown in phantom. The head restraint arrangement 20 includes a head restraint or headrest 30 and one or more headrest supports 32. The headrest support 32 may have any suitable configuration. In the embodiment shown in FIG. 2, the headrest support 32 has a generally U-shaped configuration.

The frame 22 may have any suitable configuration. In the embodiment shown in FIG. 2, the frame 22 includes first and second side supports 40,42 and first and second cross members 44,46. The first and second cross members 44,46 extend laterally to connect the first and second side supports 40,42. The side supports 40,42 and cross members 44,46 may be integrally formed or may be separate components that are joined in any suitable manner, such as by welding, fasteners, or an adhesive.

Referring to FIGS. 2 and 5, the first cross member 44 is shown in more detail. The first cross member 44 may include one or more slots 50, one or more guides 52, an aperture 54, and one or more locking arms 56.

The slots 50 are adapted to receive the head restraint arrangement 20. In the embodiment shown, the headrest support 32 extends through the slots 50. The slots 50 may be configured to allow the head restraint arrangement 20 to move upward and/or forward to contact the head of an occupant during a vehicle impact event.

The guides 52 may also be adapted to receive the head restraint arrangement 20. In the embodiment shown, the headrest support 32 extends through the guides 52. The guides 52 may be configured to provide a pivot point for changing the trajectory of the head restraint arrangement 20 during a vehicle impact event. In addition, the guides 52 may be configured to permit upward movement of the headrest support 32. The guides 52 may be integrally formed with the first cross member 44 or may be one or more separate components attached to the first cross member 44 in any suitable manner, such as by welding, fasteners, or an adhesive.

The aperture 54 may be adapted to receive the ratchet screw mechanism 26 as described in more detail below. The aperture 54 may be disposed in any suitable location. In the embodiment shown in FIG. 4, the aperture 54 is disposed in a lower portion 58 of the first cross member 44.

The locking arms 56 may be configured to inhibit movement of the ratchet screw mechanism 26 as described in more detail below. The locking arms 56 may have any suitable configuration for engaging the ratchet screw mechanism 26 and inhibiting rotational movement. As shown in FIGS. 4 and 5, the locking arms 56 may extend from the lower portion 58 toward the aperture 54.

Referring again to FIG. 1, the impact target arrangement 24 may include an armature 60, an impact target 62, and one or more pivot mechanisms 64.

The armature 60 may be attached to the head restraint arrangement 20 and may have any suitable configuration. In the embodiment shown in FIG. 2, the armature 60 includes a laterally extending portion 70 and first and second side portions 72,74. The armature 60 may be made of any suitable material, such as a polymeric material or metal.

The impact target 62 may be disposed on the armature 60. In the embodiment shown in FIG. 2, the impact target 62 is attached to the first and second side portions 72,74. The impact target 62 is configured to receive force imparted by an occupant during an impact event.

The pivot mechanisms 64 may be configured to pivotally attach the impact target arrangement 24 to the frame 22. For example, pivot mechanisms 64 may be coupled to the first and second side portions 72,74 and the first and second side supports 40,42. In addition, one or more springs 76 may be associated with the pivot mechanisms 64 or impact target arrangement 24 to bias the head restraint arrangement 20 toward the initial position.

Referring to FIG. 3, the ratchet screw mechanism 26 is shown in more detail. The ratchet screw mechanism 26 includes a first threaded member 80, a second threaded member 82, and a retaining member 84. The ratchet screw mechanism 26 is configured to permit rapid movement of the head restraint arrangement 20 from the initial position to the support position during a vehicle impact event. In addition, the ratchet screw mechanism 26 is configured to impede back driving of the head restraint arrangement 20 from the support position to the initial position during a vehicle impact event and automatically unlock to permit movement thereafter.

The first threaded member 80 may have a male configuration and the second threaded member 82 may have a female configuration as shown in FIG. 3. Alternately, the first threaded member 80 may have a female configuration and the second threaded member 82 may have a male configuration.

The first threaded member 80 may include a first tubular portion 90 and a second tubular portion 92. The first and second tubular portions 90,92 may have any suitable orientation. For example, the first and second tubular portions 90,92 may be disposed substantially perpendicular to each other as shown in FIG. 3.

The first tubular portion 90 may be configured to engage the impact target arrangement 24. In one embodiment, the first tubular portion 90 is disposed on the armature 60 and allows the ratchet screw mechanism 26 to pivot with respect to the impact target arrangement 24. The first tubular portion 90 may be insert molded or integrally formed with the armature 60.

The second tubular portion 92 may include one or more external threaded portions 100. The external threaded portions 100 may be configured to flex. More specifically, the external threaded portions 100 may be configured to flex inward towards a central axis 102 in response to force exerted on the impact target arrangement 24 during a vehicle impact event. In the embodiment shown in FIG. 3, the external threaded portions 100 are separated by axial slots 104. The axial slots 104 allow the external threaded sections 100 to independently flex. The external threaded portions 100 may have any suitable configuration and may be made of any suitable material, such as a polymeric material. In the embodiment shown in FIG. 3, the external threaded sections 100 are configured with a helical thread pattern.

Referring to FIG. 4, one embodiment of the external threaded portion 100 is shown in more detail. In one embodiment, the external threaded portion 100 may have any suitable helix angle, such as between approximately 10° to 40°. In addition, the leading section 106 and trailing section 108 of the thread are tapered. For example, the leading section 106 may have a taper angle α of approximately 30° and the trailing section 108 may have a reverse taper angle β of approximately −5°. The positive taper angle of the leading section 106 promotes ratcheting of the external threaded portion 100 through the second threaded member 82. The negative taper angle of the trailing section 108 inhibits disengagement of the external threaded portion 100 from the second threaded member 82 when force is exerted on the headrest 30.

Referring to FIG. 5, the second threaded member 82 is engageable with the first threaded member 80. The second threaded member 82 may include a body portion 110 and a thrust bearing portion 112. The body portion 110 may include a groove 114 and an internal threaded portion 116.

The thrust bearing portion 112 is adapted to inhibit rotation of the second threaded member 82. More specifically, the thrust bearing portion 112 is adapted to contact the locking arms 56 to inhibit rotation and impede back driving of the head restraint arrangement 20. In addition, the mass of the thrust bearing portion 112 helps inhibit rotation of the second threaded member 82. The thrust bearing portion 112 may have any suitable configuration. In the embodiment shown in FIGS. 3 and 5, the thrust bearing portion 112 is disposed proximate the locking arms 56 and has a larger diameter than the body portion 110. The thrust bearing portion 112 may be integrally formed with the body portion 110 or may be a separate component.

The groove 114 may be configured to engage the retaining member 84 and allow the second threaded member 82 to rotate. The groove 114 may have any suitable configuration and may be disposed in any suitable location. In the embodiment shown in FIG. 3, the groove 114 is disposed on the body portion 110 below the thrust bearing portion 112.

The internal threaded portion 116 is engageable with the external threaded portion 100. The internal threaded portion 116 may be disposed in any suitable location, such as along at least a portion of an interior surface of the body portion 110. The internal threaded portion 116 may have any suitable configuration that is compatible with the external threaded portion 100. For example, the internal threaded portion 116 may have a helix angle of approximately 10° to 40°.

The retaining member 84 is adapted to attach to the frame 22 and receive the second threaded member 82. The retaining member 84 may include one or more clip portions 120, a spring portion 122, and one or more mounting tabs 124. The clip portions 120, spring portion 122, and/or mounting tabs 124 may be integrally formed or may be separate components that are attached in any suitable manner. The retaining member 84 may be made of any suitable material, such as a polymeric material or a metal like spring steel.

The clip portions 120 are configured to engage the groove 114 to rotatably couple the second threaded member 82 to the retaining member 84. The clip portions 120 may have any suitable configuration. In the embodiment shown in FIGS. 3 and 5, the clip portions 120 are configured to flex and snap into the groove 114. More particularly, in FIG. 3 the clip portion 120 is shown in a fragmented view to reveal an inward extending clip feature 126 configured to engage the groove 114.

The mounting tabs 124 are configured to attach the retaining member 84 to the frame 22. In the embodiment shown in FIG. 5, the mounting tabs 124 are flared outward from the central axis 102 to facilitate snap-fit engagement with the frame 22. More particularly, the mounting tabs 124 are configured to flex inward when inserted through the aperture 54 and then flex outward to secure the retaining member 84 to the upper cross member 44 and inhibit rotation of the retaining member 84 about the central axis 102.

The mounting tabs 124 may have any suitable configuration. Moreover, the mounting tabs 124 may allow the retaining member 84 to rock or pivot with respect to the frame 22 to facilitate movement of the ratchet screw mechanism 26. More particularly, the mounting tabs 124 may have a curved or arcuate shape that permits the retaining member 84 to pivot to inhibit binding of the external and internal threaded portions 100, 116. The retaining member 84 may be configured to pivot by any suitable amount, such as approximately plus or minus 4° with respect to the central axis 102.

The spring portion 122 may have any suitable configuration. In the embodiment shown in FIG. 3, the spring portion is configured as a Belleville washer. Optionally, a plurality of Belleville washers may be employed to provide the desired biasing force. In the embodiment shown in FIGS. 3 and 5, the spring portion is disposed proximate the locking arms 56 and engageable with the second threaded member 82.

Movement of the head restraint arrangement 20 during a vehicle impact event will now be described. Before a vehicle impact event, the head restraint arrangement 20 is disposed in the initial position. During a vehicle impact event, such as rear vehicle impact, the seat occupant exerts a rearward force on the impact target arrangement 24. This force causes the impact target arrangement 24 to move rearward and pivot about the pivot mechanism 64. In addition, force is transmitted from the impact target arrangement 24 to the ratchet screw mechanism 26.

If the force or impulse transmitted to the ratchet screw mechanism 26 exceeds a threshold amount, the external threaded portions 100 flex to at least partially disengage the internal threaded portion 116, allowing the first threaded member 80 to ratchet through the second threaded member 82. Ratcheting permits the head restraint arrangement 20 to move rapidly upward and/or forward toward the support position to support the head of an occupant. Moreover, the rotational inertia of the second threaded member 82 inhibits rotational engagement with the first threaded member 80.

If the force or impulse transmitted to the ratchet screw mechanism 26 does not exceed a threshold amount, the external threaded portions 100 do not flex sufficiently to permit ratcheting. Instead, the external and internal threaded portions 100, 116 remain engaged. Moreover, the second threaded member 82 is permitted to rotate about the first threaded member 80.

As the occupant moves rearward, the occupant's head contacts the headrest 30. The force or impulse exerted by the occupant's head on the headrest 30 attempts to move the head restraint arrangement 20 from the support position back toward the initial position. This back driving force is transmitted to the ratchet screw mechanism 26.

Figure 6:
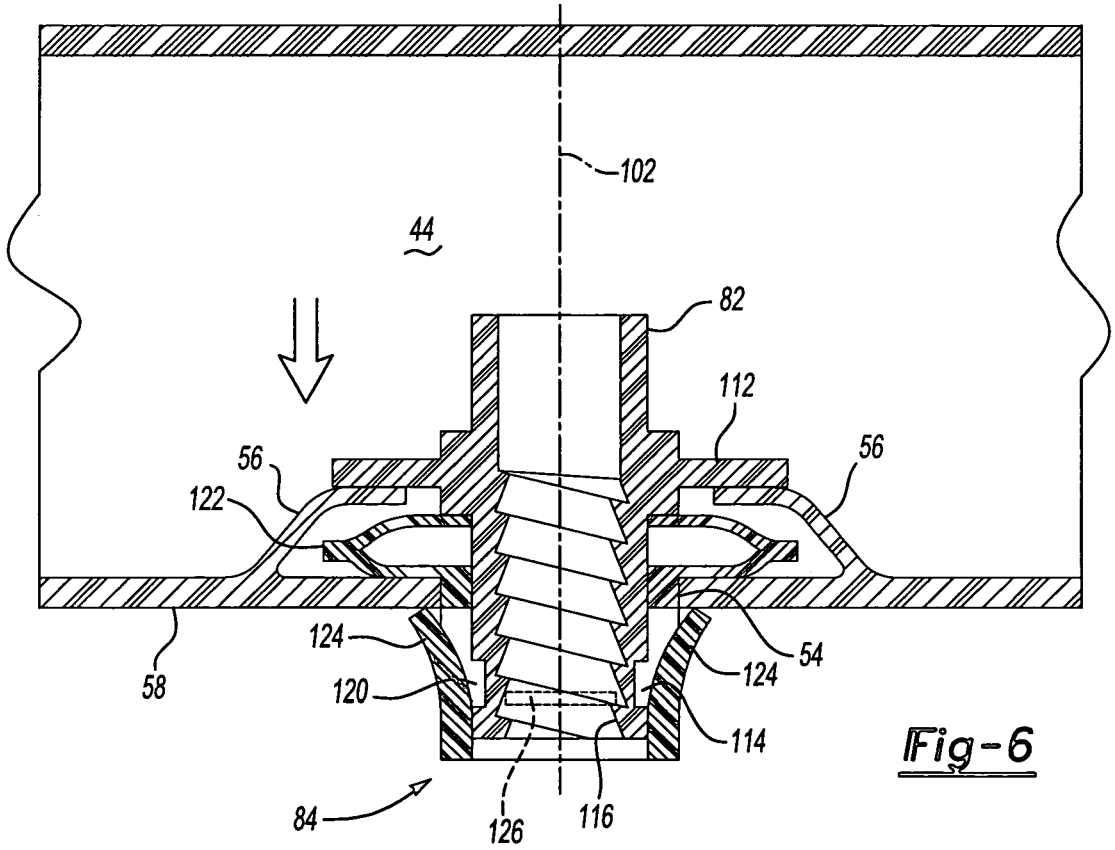
FIG. 6 is a cross-section of the ratchet screw mechanism in a locked position.

If a sufficient downward impulse is transmitted to the ratchet screw mechanism 26, the second threaded member 82 moves downward to a locked position as shown in FIG. 6. In the locked position, the second threaded member 82 engages the locking arms 56 and at least partially compresses the spring portion 122.

Due to frictional and inertial forces, the head restraint arrangement 20 remains locked in the support position during the impact event. More specifically, if the reversing torque is less than sum of the frictional torques between the external and internal threaded portions 100, 116, the groove 114 and clip feature 126, and the locking arms 56 and thrust bearing portion 112, then the head restraint arrangement 20 remains locked to inhibit movement toward the initial position. In addition, the thread configuration of the external and internal threaded portions 100, 116 inhibits ratcheting of the ratchet screw mechanism 26 toward the initial position while rotational inertia inhibits rotation of the second threaded member 82.

The coefficient of friction between the thrust bearing portion 112 and the locking arms 56 may be greater than the coefficient of friction between the external and internal threaded portions 100, 116. Similarly, the coefficient of friction between the groove 114 and the clip feature 126 may be greater than the coefficient of friction between the external and internal threaded portions 100, 116. In one embodiment, the coefficient of friction between the thrust bearing portion 112 and locking arms 56 may be approximately 0.4 while the coefficient of friction between the external and internal threaded portions 100, 116 may be approximately 0.15.

If a sufficient downward impulse is not transmitted to the ratchet screw mechanism 26, then the head restraint arrangement 20 does not lock. More specifically, if the reversing torque is greater than the frictional torque between the external and internal threaded portions 100, 116 plus the frictional force between the groove 114 and the clip feature 126, then the head restraint arrangement 20 does not lock.

After the impact event, the forces transmitted through the head restraint arrangement 20 and ratchet screw mechanism 26 decrease. The spring portion 122 biases the second threaded member 82 away from the locking arms 56 to an unlocked position when the biasing force exerted by the spring portion 112 exceeds the downward or back driving force imparted via the head restraint arrangement 20. As such, the second threaded portion 82 is free to rotate about the first threaded member 80. Moreover, the axial force through the ratchet screw mechanism 26 and the weight of the head restraint arrangement 20 may cause the head restraint arrangement 20 to slowly actuate back toward the initial position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat for use with a vehicle, the vehicle seat comprising:
   a seatback having a frame;
   a head restraint arrangement;
   an impact target arrangement attached to the head restraint arrangement and moveably attached to the frame; and
   a ratchet screw mechanism including a first threaded member disposed proximate the impact target arrangement and a second threaded member associated with the frame and engageable with the first threaded member;
   wherein upon application of a sufficient rearward force on the impact target arrangement, the first threaded member is configured to at least partially disengage the second threaded member to allow the head restraint arrangement to move from an initial position to a support position.

2. The vehicle seat of claim 1 wherein the first threaded member further comprises a first tubular portion moveably disposed on the impact target arrangement.

3. The vehicle seat of claim 2 wherein the first threaded member further comprises a second tubular portion disposed proximate the first tubular portion, the second tubular portion having a first threaded section configured to flex in response to application of the rearward force on the impact target arrangement to allow the first threaded member to ratchet through the second threaded member.

4. The vehicle seat of claim 1 wherein the second threaded member comprises a body portion and a thrust bearing portion disposed proximate the body portion, the thrust bearing portion being configured to inhibit rotation of the second threaded member.

5. The vehicle seat of claim 1 further comprising a retaining member attached to the frame and configured to receive the second threaded member.

6. The vehicle seat of claim 5 wherein the retaining member further comprises a retention tab and a spring portion that cooperate to attach the retaining member to the frame.

7. The vehicle seat of claim 6 wherein the frame further comprises a locking arm disposed proximate the spring portion, the locking arm being adapted to inhibit rotation of the second threaded member about the first threaded member when the head restraint arrangement is actuated toward the initial position.

8. The vehicle seat of claim 7 wherein the spring portion is configured to bias the second threaded member away from the locking arm to permit the second threaded member to rotate about the first threaded member.

9. A vehicle seat for use with a vehicle, the vehicle seat comprising:
   a seatback having a frame;
   a locking arm disposed on the frame;

a head restraint arrangement having a headrest and a support member connected to the headrest;

an impact target arrangement attached to the head restraint arrangement and moveably attached to the frame; and a ratchet screw mechanism including:

a first threaded member disposed on the impact target arrangement, the first threaded member having an external threaded portion;

a second threaded member having an internal threaded portion engageable with the external threaded portion; and a retaining member attached to the frame and adapted to receive the second threaded member;

wherein upon application of a sufficient rearward force on the impact target arrangement, the first threaded member is configured to at least partially disengage the second threaded member to allow the head restraint arrangement to move from an initial position to a support position, and the locking arm is configured to inhibit rotation of the second threaded member to inhibit movement of the head restraint arrangement from the support position to the initial position when a sufficient impulse force is applied to the headrest by a vehicle occupant.

10. The vehicle seat assembly of claim 9 wherein the second threaded member further comprises a thrust bearing portion adapted to contact the locking arm when the sufficient impulse force is applied to the headrest.

11. The vehicle seat assembly of claim 10 wherein a first coefficient of friction between the thrust bearing portion and the locking arm is greater than a second coefficient of friction between the internal and external threaded portions.

12. The vehicle seat assembly of claim 9 wherein the retaining member further comprises a spring portion configured to bias the second threaded member away from the locking arm.

13. The vehicle seat assembly of claim 9 wherein the retaining member further comprises a retention tab engageable with the frame.

14. The vehicle seat assembly of claim 9 wherein the external threaded section is configured to flex to allow the first threaded member to ratchet through the second threaded member to move the head restraint arrangement toward the support position when the rearward force is applied to the impact target arrangement.

15. A vehicle seat for use with a vehicle, the vehicle seat comprising:

a seatback having a frame;

a locking arm disposed on the frame;

a head restraint arrangement having a headrest and a support member connected to the headrest;

an impact target arrangement attached to the head restraint arrangement and moveably attached to the frame; and a ratchet screw mechanism including:

a first threaded member disposed on the impact target arrangement, the first threaded member having an external threaded portion;

a second threaded member having an internal threaded portion engageable with the external threaded portion; and a retaining member attached to the frame and adapted to receive the second threaded member;

wherein upon application of a threshold force impulse on the impact target arrangement the external threaded portion is configured to flex to at least partially disengage the internal threaded portion to allow the head restraint arrangement to move from an initial position to a support position.

16. The vehicle seat assembly of claim 15 wherein the locking arm is configured to inhibit rotation of the second threaded member to inhibit movement of the head restraint arrangement from the support position to the initial position when a sufficient impulse force is applied to the headrest by a vehicle occupant.

17. The vehicle seat assembly of claim 15 wherein the retaining member further comprises a spring portion configured to bias the second threaded member away from the locking arm.

18. The vehicle seat assembly of claim 17 wherein the second threaded member further comprises a thrust bearing portion adapted to contact the locking arm when sufficient force is applied to the headrest to overcome a biasing force exerted by the spring portion.

19. The vehicle seat assembly of claim 15 wherein the second threaded member further comprises a groove and the retaining member further comprises a clip engageable with the groove to rotatably couple the second threaded member to the retaining member.

20. The vehicle seat assembly of claim 15 wherein the external threaded portion further comprises a plurality of threaded regions separated by a plurality of axial slots.

* * * * *